United States Patent [19]

Stone

[11] 4,441,188
[45] Apr. 3, 1984

[54] DYE LASERS

[75] Inventor: Julian Stone, Rumson, N.J.

[73] Assignee: Bell Telephone Laboratories, Incorporated, Murray Hill, N.J.

[21] Appl. No.: 299,655

[22] Filed: Sep. 8, 1981

[51] Int. Cl.³ ............................................. H01S 3/20
[52] U.S. Cl. ...................................... 372/54; 372/53; 350/361; 356/411; 356/426; 356/246
[58] Field of Search ............................ 372/54, 53, 51; 350/361; 356/246, 410, 411, 426

[56] References Cited

U.S. PATENT DOCUMENTS

| | | | |
|---|---|---|---|
| 3,063,331 | 11/1962 | Glenn, Jr. ............................ | 350/361 |
| 3,341,657 | 9/1967 | Romano, Jr. et al. ............... | 350/361 |
| 3,489,941 | 1/1970 | Towlson .............................. | 350/361 |
| 3,766,489 | 10/1973 | Rosenberg et al. ................ | 331/94.5 |
| 3,984,786 | 10/1976 | Pike ..................................... | 372/54 |
| 4,283,120 | 8/1981 | Orser et al. ......................... | 350/361 |
| 4,363,535 | 12/1982 | Towlson ............................. | 350/361 |

*Primary Examiner*—William L. Sikes
*Assistant Examiner*—Léon Scott, Jr.
*Attorney, Agent, or Firm*—John K. Mullarney

[57] ABSTRACT

A dye laser (FIG. 1, 5 or 6) includes a pumping laser source (e.g. 11), an optical resonator (e.g. 13-15), and a dye solution or dye cell (e.g. 12) disposed in the path of the pumping laser light in the resonator. The dye cell disclosed herein comprises a pair of closely spaced transparent discs (21). A motor (26) serves to spin the discs at a high rate of speed. The pumping laser light in the resonator is focused on the discs at a predetermined angle (i.e. the Brewster angle). New, unbleached dye is injected axially with respect to the discs so that the spin force causes a radial flow of the dye solution between the spinning discs and, of course, past the pumping laser light spot.

8 Claims, 6 Drawing Figures

4,441,188

DYE LASERS

TECHNICAL FIELD

This invention relates to a dye lasers and, more particularly, to an arrangement for achieving a thin dye cell for the same.

BACKGROUND OF THE INVENTION

As noted in the U.S. patent to R. Rosenberg and P. K. Runge, U.S. Pat. No. 3,766,489, issued Oct. 16, 1973, dye lasers are attractive because of the extremely broad tuning bandwidths that can be achieved. However, in such lasers, it is necessary to focus the pumping light beam to a maximum extent in the dye medium in order to reduce the oscillation threshold. The dye bleaching and other damage which results from such intense pumping is rendered unobjectionable by flowing the dye through the pumping region.

In the cited Rosenberg et al patent a thin free-flowing dye stream was achieved by means of a special nozzle through which the dye solution was discharged. This technique has now been widely adopted. Unfortunately, the instability of the fluid dynamics of the free-flowing stream affects the stability of the output. This instability also limits the choice of solvents based on viscosity. Further, the dye stream cannot be made as thin as one would like.

In the still earlier approach, the dye solution flowed through the focused laser pump spot between glass windows or plates that were permanently positioned (i.e., stationary). However, since the spacing between these windows must, of necessity, be slight, it was difficult to force the dye solution down between them at the desired rate of flow without producing fluid turbulence, window deformations, etc. Also, the concentrated laser pump spot was continually focused at the same place on the windows and this caused burn or heat induced degradations of, and deformations in, the windows. Because of these handicaps, the aforementioned free-flowing dye stream approach was adopted.

SUMMARY OF THE INVENTION

As with all dye lasers, a dye laser constructed in accordance with the present invention will comprise a pumping laser source, an optical resonator, and a dye solution or dye cell disposed in the path of the pumping laser light in the resonator. The dye cell of the present invention comprises a pair of closely spaced (e.g., 10 micrometers) transparent discs. These discs are spun at a high rate of speed. The pumping laser light in the resonator is focused on the discs at a predetermined angle (i.e., the Brewster angle). New, unbleached dye is injected axially with respect to the discs so that the spin force (i.e., centrifugal force) causes a radial flow of the dye between the spinning discs and, of course, past the pumping laser light spot.

In accordance with a feature of the invention the cavity into which the dye solution is injected is wider in the central unpumped region. This improves the flow of the dye solution in the narrow gap between the spinning discs.

BRIEF DESCRIPTION OF THE DRAWING

A complete understanding of the present invention and of the above and other features thereof can be gained from a consideration of the following detailed description when the same is read in conjunction with the accompanying drawings in which.

DETAILED DESCRIPTION

Figure 1:
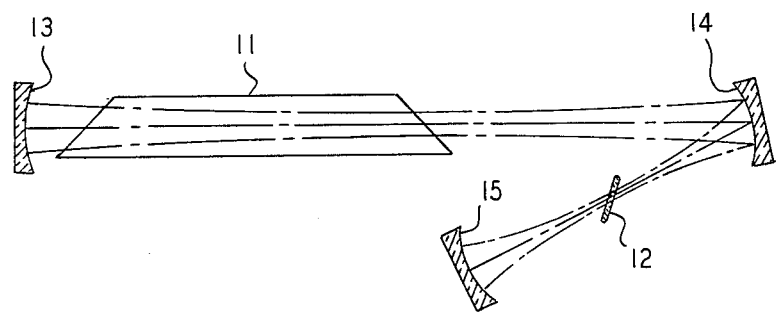
FIG. 1 is a schematic diagram of a dye laser which can advantageously incorporate a dye cell in accordance with the present invention.

Turning now to the drawings, FIG. 1 shows a dye laser which can advantageously utilize the present invention. The laser of FIG. 1 is an intracavity-pumped continuous-wave flowing dye laser. The pumping laser source 11 and the dye cell 12 share the same optical resonator. The resonator comprises the reflectors 13, 14 and 15. Reflectors 13 and 14 have curvatures suitable for maintaining a substantially collimated pumping light beam in the pump laser 11. Simultaneously, reflector 14 cooperates with reflector 15, which has a relatively small radius of curvature as compared to reflector 13, to focus the pumping light beam to as small a waist or spot as possible within the dye cell 12.

The pumping light beam is focused on the dye cell 12 at substantially the well-known Brewster angle. The dye solution may comprise rhodamine 6G dissolved in the viscous solvent ethylene glycol. It must be understood, however, that the invention is in no way limited to this particular dye solution, and any of the various known dye solutions can be utilized. The configuration of the laser components shown in FIG. 1 is, of course, well known to those in the art (e.g., see FIG. 1 of the cited Rosenberg-Runge patent). And, as further shown in this patent, the dye cell 12 need not be placed within the pumping laser cavity but may have its own resonator separate from the laser pump source. What is new in the dye laser of FIG. 1 is the dye cell 12 which, in accordance with the invention, can provide a dye stream that is thinner, in the region of the laser pump spot, than has heretofore been realized. A thinner dye stream, of course, permits better output control, less dispersion, and so on.

Figure 2:
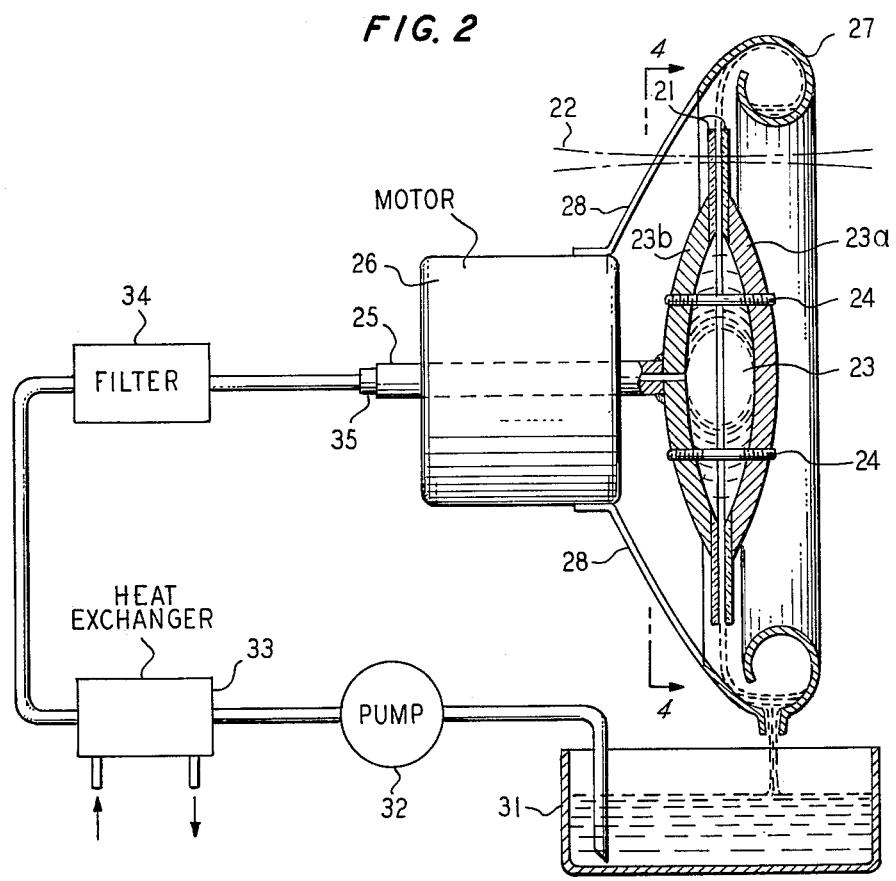
FIG. 2 is a diagrammatic illustration, partially in cross section, of the present invention, as well as the complete dye flow apparatus.

The dye cell 12 of FIG. 1 comprises a pair of closely spaced (e.g., 10 micrometers) transparent discs 21 that are shown in FIG. 2 disposed in the path of the pumping laser light 22. The transparent discs 21 have a washer-like configuration and can be made of glass or synthetic sapphire. The discs are secured to the periphery of the circular housing 23 by any of the well known adhesives. For ilustrative purposes only, the discs 21 appear to extend substantially beyond the housing 23. In practice, the discs would extend beyond the housing only about one-sixteenth of an inch or less. This is more than enough since the waist of the focused pumping light beam is measured in micrometers.

The housing 23 consists of two circular, concave, dish-shaped halves 23a and 23b which are secured together by means of three (or more) screws 24. The housing halves may be made of metal or any other suitable material. The housing 23 is mounted on the hollow shaft 25.

The screws 24 have oppositely threaded screw ends so that by simple screw driver adjustment the housing halves and, more importantly, the discs 21 can be moved axially with respect to one another. Thus, it is a relatively simple matter to set the spacing between the transparent discs 21 to the desired amount. A spacer or "feeler gauge" can be used for this purpose. If the disc spacing is quite critical, there are known "light interference" techniques which can be utilized to set accurately the gap between the discs. In accordance with the invention, a disc spacing of 10 micrometers or less may be achieved.

Figure 4:
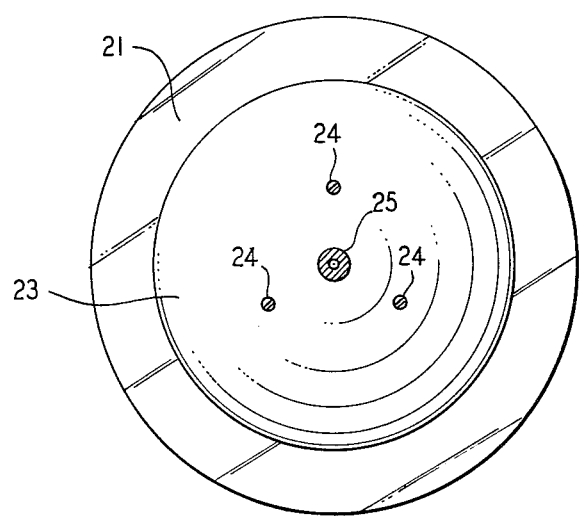
FIG. 4 is a side view of the discs and housing as seen from the line 4—4 in FIG. 2.

As shown in the FIG. 4 side view of the discs and housing, three spaced screws 24 can be used to secure together the two housing halves. More screws, of course, may be used if necessary or, alternatively, additional support means can be relied upon—such as telescoping tubes having an end of each tube fastened to one of the housing halves.

Figure 3:
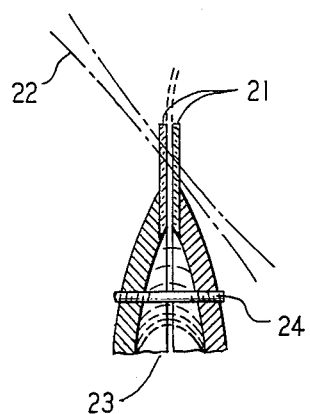
FIG. 3 is a cross-section, partial top view of the circular discs and supporting housing shown in FIG. 2.

As shown more clearly in the top view of FIG. 3, the pumping light beam 22 is focused on the transparent discs 21 at the well-known Brewster angle.

The motor 26 is used to turn the shaft 25, and thus rotate the housing and discs, at a high rate of speed (e.g., 3000 r.p.m.). New, unbleached dye is injected axially into the cavity between the housing halves, in the manner to be described, and centrifugal force causes a radial flow of the dye solution between the spinning discs and, of course, past the pumping laser light spot.

The cavity between the housing halves 23a and 23b provides a reservoir in which the dye solution collects prior to its outward radial flow between the closely spaced, spinning discs. The provision of this reservoir improves the flow of the dye solution in the narrow gap between the spinning discs.

A circular trough or dye catcher 27 surrounds the discs 21 and serves to catch the dye solution as it exits from the spinning discs. The shape of this annular dye catcher is quite evident from the cross-section showing in FIG. 2. The catcher 27 is secured to the motor housing by means of struts or support arms 28. Other arrangements for catching the dye solution will be apparent to those in the art and therefore it must be understood that the invention is in no way limited to the dye catching structure shown in the drawings.

One or more holes are provided in the bottom of the catcher 27 to permit the dye solution to drain into the reservoir 31. The dye solution is pumped out of reservoir 31 by pump 32 and then passes through a heat exchanger 33 and a filter 34. The filter 34 is designed primarily to eliminate particles and the bubbles that tend to form in the viscous solvent. The filtered dye solution is then injected into the hollow shaft 25, via a slip ring 35, and subsequently into the cavity between the housing halves 23a, b.

Figure 5:
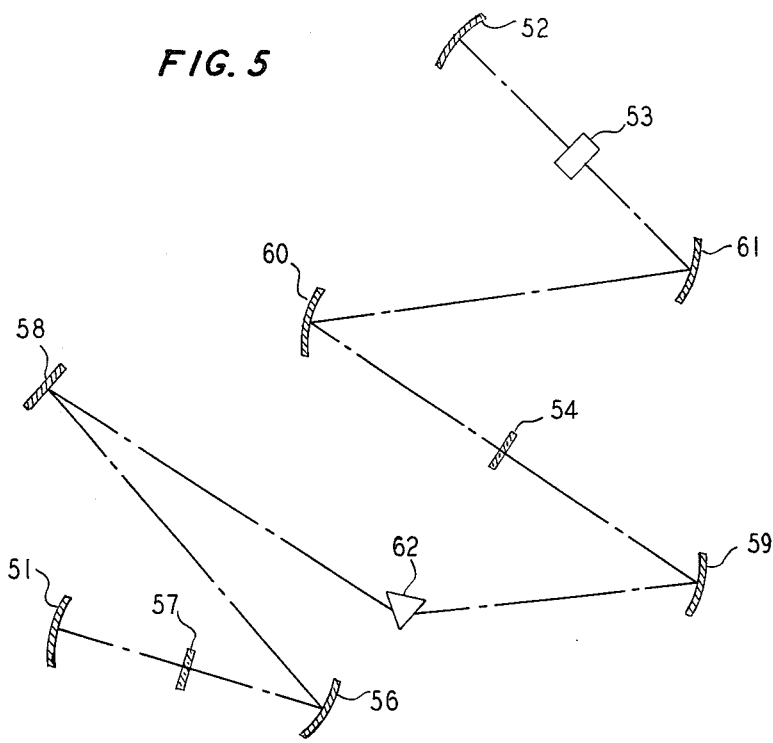
FIG. 5 is a schematic diagram of another dye laser which can incorporate at least one dye cell in accordance with the invention.

FIG. 5 shows a dye laser which can make advantageous use of the dye cell(s) of the present invention. The laser comprises a pair of spaced multilayer dielectric mirrors 51 and 52 which serve as the reflective ends of the layer cavity or resonator. Both mirrors are highly reflective at the wavelength of interest. The "dumper" 53 is used to remove output power from the laser and it includes an acousto-optic cell in the form of a quartz block to which is connected a source of electrical pulses to control the deflection of light from the resonator for utilization outside the resonator. Also included within the laser cavity is the emitting cell 54 which houses the active medium, a dye mixture of Rhodamine 6G dye in a viscous solvent of high purity ethylene glycol. This cell is pumped continuously by an argon laser (not shown). To achieve compactness, the resonator path is folded by the provision of auxiliary optical elements. The auxiliary elements include a third curved mirror 56 which together with curved mirror 51 forms an auxiliary section within which is located the saturable absorber 57 in the path of the emitted light beam. This comprises a cell enclosing a mixture of a fast-recovery absorber and a slow-recovery absorber. As with the cell 54, the mixture moves past the beam as a free-falling flowing stream. Other auxiliary optical elements serving to fold the extended path of the laser resonator, as shown, include plane mirror 58, curved mirror 59, curved mirror 60, and curved mirror 61. Moreover, prism 62 is included and made adjustable to provide fine tuning of the output wavelength in a well-known manner. For improved efficiency, the various mirrors are designed to cooperate in a fashion to focus the beam to a waist of reduced cross section at the regions where the beam traverses each of dumper cell 53, active cell 54, and saturable absorber cell 57.

The configuration of the laser components shown in FIG. 5 is known to those in the art; see the patent to E. P. Ippen and C. V. Shank, No. 3,978,429, issued Aug. 31, 1976. However, instead of the free-falling flowing streams utilized by the patentees Ippen and Shank, the laser and/or absorption cells 54 and 57 can be constructed in accordance with the present invention. By incorporating cells of the invention into the FIG. 5 dye laser, even shorter pulses of increased stability may be realized.

As will be evident to those in the art, the dumper 53 can be dispensed with and one of the mirrors 51 or 52 made slightly transparent to permit passage of the laser output power. Additional descriptive details of the dye laser of FIG. 5 may be had by reference to the cited patent to Ippen and Shank.

Figure 6:
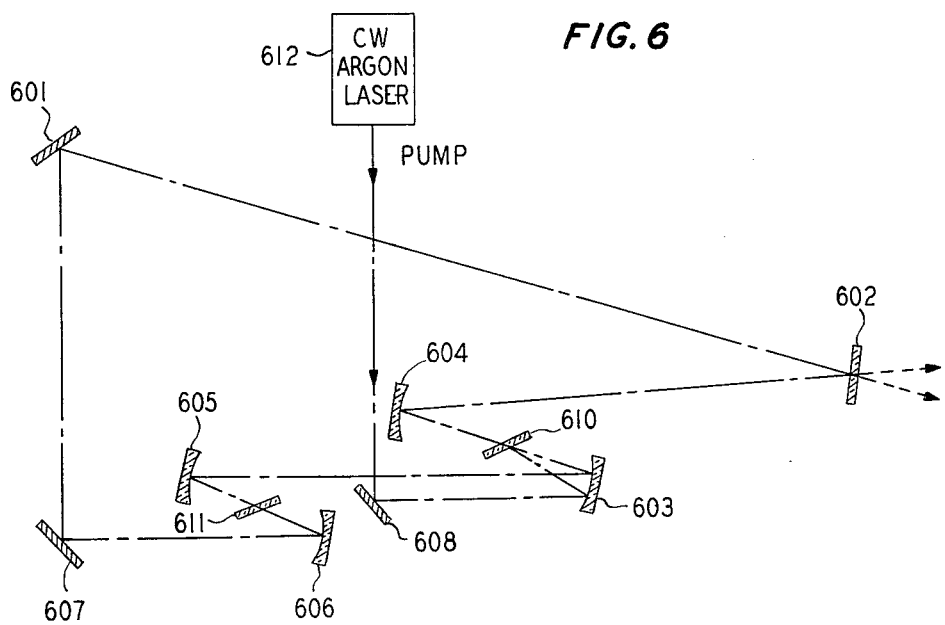
FIG. 6 is a schematic diagram of still another dye laser which can use the present invention to advantage.

FIG. 6 shows a colliding pulse ring (dye) laser incorporating at least one dye cell in accordance with the present invention. The laser comprises mirrors 601 through 607, which are arranged to form a ring laser cavity. Mirrors 601 and 607 are 100 percent reflective, whereas mirror 602 is partially transmissive thereby permitting pulses that are generated in the ring laser cavity to be coupled out of the cavity. The curvature of mirrors 603 through 606 is selected such that the laser operates in the lowest transverse mode. In addition, the mirrors 603 and 604 (10 cm radius of curvature) are positioned so as to focus the generated light pulses into a dye cell 610. Mirrors 605 and 606 (5 cm radius of curvature) are positioned so as to focus the generated light pulses into a saturable absorber stream 611 consisting of DODCI (diethyloxadicarbocyanine iodide) dissolved in ethylene glycol. The curvature of mirrors 603 through 606 is also selected so as to achieve the stability conditions that involve the beam cross sections in the amplifying and absorbing regions and the amplifier and absorber molecular cross sections. The gain stream or dye cell 610 is pumped by a continuous argon laser 612 whose output is coupled by way of a mirror 608 onto the curved surface of mirror 603. This pump beam from laser 612 is reflected by mirror 603 so as to cause the beam to impinge on the gain stream 610. Additional descriptive details of this ring laser may be had by reference to the patent application of R. L. Fork, B. I.

Greene and C. V. Shank, Ser. No. 259,548, now U.S. Pat. No. 4,400,814 filed May 1, 1981.

In the cited application, the gain cell 610 and absorption cell 611 comprise free-falling flowing streams discharged from specially designed nozzles. In particular, the nozzle that is used to create the saturable absorber dye stream, of approximately 10 microns thickness, is a very specially constructed nozzle. For the latter, a dye stream nozzle such as disclosed in the cited Rosenberg-Runge patent is subjected to four separate compression steps, each requiring a great deal of care. Now, in accordance with the present invention, instead of the free-falling flowing streams, the gain cell 610 and absorption cell 611 can be realized in the manner disclosed herein. And, by incorporating dye cells in accordance with the invention into the FIG. 6 ring laser, even shorter pulses of increased stability may be realized.

It is to be understood that the foregoing disclosure relates to only a particular embodiment of the invention and that numerous modifications or alterations may be made therein without departing from the spirit and scope of the invention.

What is claimed is:

1. In a dye laser (FIGS. 1, 5 or 6) which comprises a pumping laser source (e.g., 11), an optical resonator (e.g., 13–15), and a dye solution flowing through a dye cell (e.g., 12) disposed in the path of the pumping laser light in said resonator, said dye cell being characterized by a pair of closely spaced transparent discs (21), means (26) for spinning said discs at a high rate of speed, a pumping laser light spot being focused on the discs at a predetermined angle, and means (32 and 25) for injecting said dye solution axially with respect to said discs so that a radial flow of the dye solution is caused by the spin force.

2. In a dye laser as defined in claim 1 wherein the dye solution is injected into a cavity that is substantially wider than the spacing between said transparent discs.

3. In a dye laser as defined in claim 2 including means (24) for axially moving said transparent discs with respect to one another.

4. In a dye laser as defined in claim 3 including a dye catcher (27) surrounding said discs and serving to catch the dye solution as it exits from the spinning discs.

5. In a dye laser as defined in claim 4 including means (31–34 and 25) for recirculating the dye solution caught by said dye catcher and reinjecting the same into said cavity.

6. In a dye laser (FIGS. 1, 5 or 6) which comprises a pumping laser source (e.g., 11), an optical resonator (e.g., 13–15), and a dye solution flowing through a dye cell (e.g., 12) disposed in the path of the pumping laser light in said resonator, said dye cell being characterized by a pair of closely spaced transparent discs (21) having a washer-like configuration, a housing (23) of two circular concave halves (23a and 23b) secured together, each disc being mounted on the periphery of a respective one of the housing halves, means (26) for spinning said discs at a high rate of speed, a pumping laser light spot being focused on the discs substantially at the Brewster angle, and means (32 and 25) for injecting the dye solution axially into the space between the housing halves so that a radial flow of the dye solution is caused by the spin force.

7. In a dye layer as defined in claim 6 wherein the convave housing halves provide a reservoir for the injected dye solution prior to its outward flow between the closely spaced, spinning discs.

8. In a dye laser as defined in claim 7 including means (24) for adjustably controlling the spacing between the transparent discs.

* * * * *